(12) United States Patent
Itakura et al.

(10) Patent No.: US 6,569,796 B2
(45) Date of Patent: May 27, 2003

(54) DIELECTRIC PORCELAIN COMPOSITION AND DIELECTRIC RESONATOR USING THE SAME

(75) Inventors: Kazuhisa Itakura, Nagoya (JP); Takashi Oba, Nagoya (JP); Akifumi Tosa, Nagoya (JP); Kazushige Obayashi, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 149 days.

(21) Appl. No.: 09/937,501

(22) PCT Filed: Jan. 31, 2001

(86) PCT No.: PCT/JP01/00636
§ 371 (c)(1),
(2), (4) Date: Jan. 7, 2002

(87) PCT Pub. No.: WO01/56952
PCT Pub. Date: Aug. 9, 2001

(65) Prior Publication Data
US 2003/0050179 A1 Mar. 13, 2003

(30) Foreign Application Priority Data
Jan. 31, 2000 (JP) .......................... 2000-023054

(51) Int. Cl.[7] ............................................. C04B 35/495
(52) U.S. Cl. ..................................... 501/135; 333/219.1
(58) Field of Search .......................... 501/135; 333/219.1

(56) References Cited

FOREIGN PATENT DOCUMENTS

JP            11-71173         3/1999   ......... C04B/35/495

Primary Examiner—David Brunsman
(74) Attorney, Agent, or Firm—Morgan, Lewis & Bockius LLP

(57) ABSTRACT

The present invention is directed to a dielectric ceramic composition exhibiting a high unloaded quality factor and a small variation thereof. The dielectric ceramic composition of the invention containing Ba, Zn, and Ta, contains 100 parts by weight of a predominant component represented by $xBaO$—$yZnO$—$(½)zTa_2O_5$ ($x$, $y$, and $z$ represent compositional proportions by mol and satisfy $x+y+z=1$), wherein $x$, $y$, and $z$ fall within a quadrilateral region formed by connecting points A ($x=0.503$, $y=0.152$, $z=0.345$), B ($x=0.497$, $y=0.158$, $z=0.345$), C ($x=0.503$, $y=0.162$, $z=0.335$), and D ($x=0.497$, $y=0.168$, $z=0.335$) (sides AB, BD, DC, and CA being included) as shown in FIG. 1; 0.2–1.6 parts by weight K as reduced to $K_2O$; and 0.7–8 parts by weight Ta as reduced to $Ta_2O_5$, wherein the ratio by weight of K to Ta falls within the range of 0.185–0.4. The dielectric resonator of the present invention is formed of the dielectric ceramic composition.

8 Claims, 2 Drawing Sheets

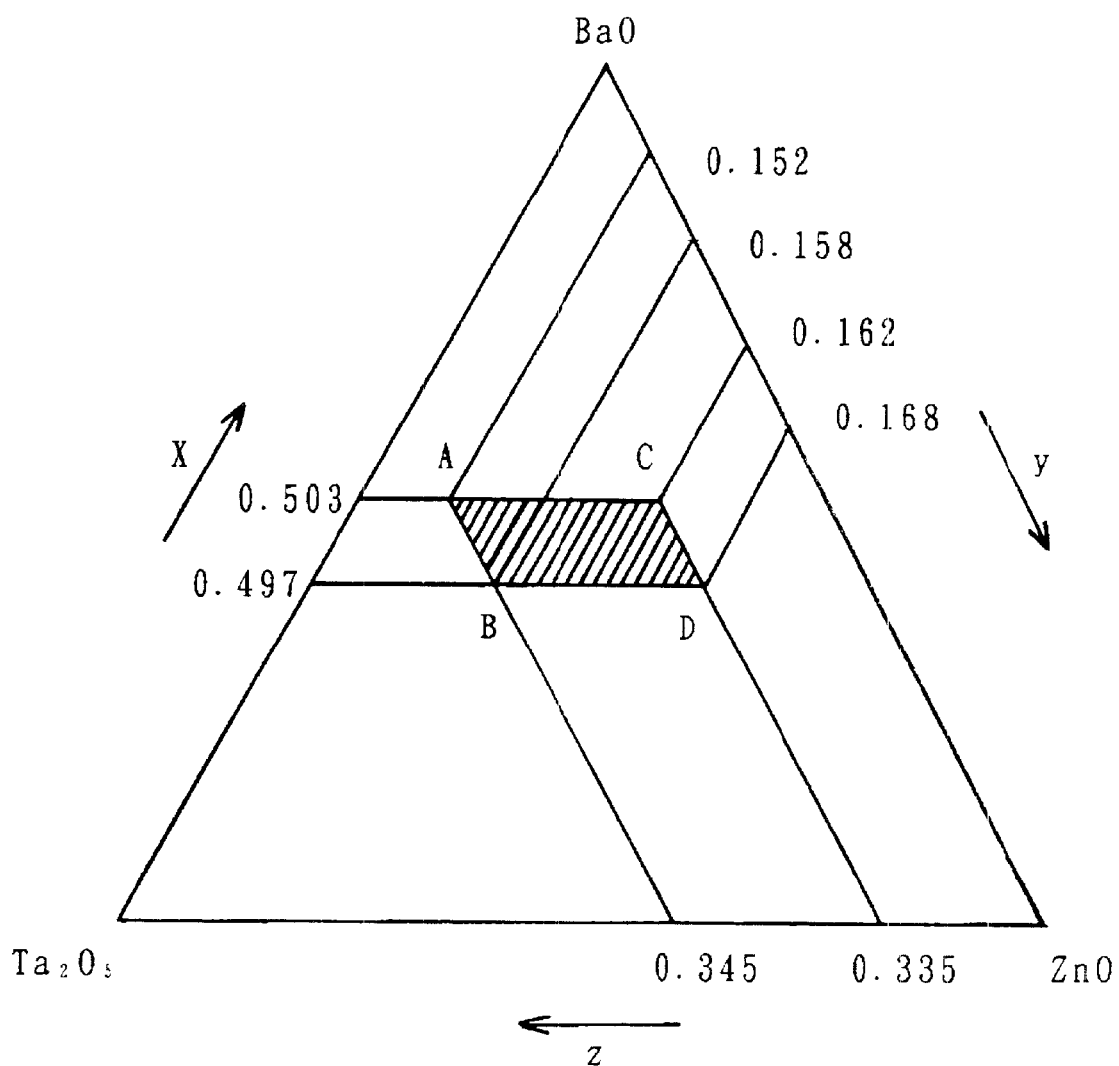
F I G. 1

DIELECTRIC PORCELAIN COMPOSITION AND DIELECTRIC RESONATOR USING THE SAME

This application is a 371 of PCT/JP01/00636 filed Jan. 31, 2001.

TECHNICAL FIELD

The present invention relates to a dielectric ceramic composition of excellent dielectric characteristics in a high-frequency region, particularly such a composition exhibiting a high unloaded quality factor (hereinafter referred to as "$Q_u$") and a small variation thereof, and to a dielectric resonator formed of the composition. The dielectric ceramic composition of the present invention can be used in dielectric filters, multilayer circuit boards, etc. for use in a high-frequency region.

BACKGROUND ART

Compositions represented by $BaO$—$ZnO$—$Ta_2O_5$ are known to be dielectric ceramic compositions which can be used in a high-frequency region. Such dielectric ceramic compositions for use in a high-frequency region must satisfy the following requirements:

(1) a high dielectric constant (hereinafter referred to as "$\epsilon_r$")

(2) a small absolute value of the temperature coefficient (hereinafter referred to as "$\tau_f$") of resonance frequency (hereinafter referred to as "$f_0$"); and (3) a high $Q_u$ in a high-frequency region.

The $BaO$—$ZnO$—$Ta_2O_5$ dielectric ceramic compositions are oxides represented by the compositional formula of $Ba(Zn_{1/3}Ta_{2/3})O_3$ and have a complex perovskite-type crystal structure. These oxides are generally referred to as BZT. The BZT dielectric ceramic compositions exhibit excellent dielectric characteristics, such as a high $Q_u$. However, in recent years, there is a demand for a dielectric ceramic composition having a higher $Q_u$, since the frequency region where such dielectric ceramic compositions are used has become higher; i.e., from the microwave region to the sub-millimeter region.

Publication of Unexamined Patent Application No. Hei 11-71173 discloses that a dielectric ceramic composition of more excellent dielectric characteristics can be obtained by incorporating a K component and a Ta component into an oxide represented by the compositional formula of $Ba(Zn_{1/3}Ta_{2/3})O_3$. Although incorporation of these specific components attains enhancement of dielectric characteristics, uniform $Q_u$ cannot always be attained, and variation in $Q_u$ may occur. Thus, provision of a dielectric ceramic composition exhibiting a smaller variation in dielectric characteristics is desired.

The present invention has been accomplished in order to solve the aforementioned problems, and an object of the invention is to provide a dielectric ceramic composition capable of attaining a high $Q_u$ without variation, by means of employing specific proportions by amount of elements in the predominant component formed of an oxide containing Ba, Zn, and Ta and by limiting the ratio by amount of K component to Ta component other than the predominant component and the ratio by weight of K to Ta. Another object of the invention is to provide a dielectric resonator formed of the dielectric ceramic composition.

DISCLOSURE OF THE INVENTION

The dielectric ceramic composition of the present invention contains Ba, Zn, and Ta, and is characterized by comprising 100 parts by weight of a predominant component represented by $xBaO$—$yZnO$—$(½)zTa_2O_5$ (x, y, and z represent compositional proportions by mol and satisfy x+y+z=1), wherein x, y, and z fall within a quadrilateral region formed by connecting points A (x=0.503, y=0.152, z=0.345), B (x=0.497, y=0.158, z=0.345), C (x=0.503, y=0.162, z=0.335), and D (x=0.497, y=0.168, z=0.335) (sides AB, BD, DC, and CA being included) as shown in FIG. 1; 0.2–1.6 parts by weight K as reduced to $K_2O$; and 0.7–8 parts by weight Ta as reduced to $Ta_2O_5$, wherein the ratio by weight of K to Ta falls within the range of 0.185–0.4.

The dielectric resonator of the present invention is characterized by being formed of the above-described dielectric ceramic composition of the present invention.

In the dielectric ceramic composition of the present invention, the aforementioned "$xBaO$—$yZnO$—$(½)zTa_2O_5$" serving as the predominant component is an oxide having a complex perovskite-type crystal structure. Some portion of Ba atoms are substituted by K, and the perovskite-type crystal structure is thought to be maintained.

In the predominant component, when any of x, y, and z is in excess of the upper limit or less than the lower limit, variation in $Q_u$ becomes large, even though excellent $\epsilon_r$ and $\tau_f$ and a high average $Q_u$ are obtained. Thus, a dielectric ceramic composition of dielectric characteristics with small variations cannot be produced. When at least two of x, y, and z are in excess of the upper limits or less than the lower limits, the average $Q_u$ is prone to decrease and variation in $Q_u$ becomes large, even through $\epsilon_r$ and $\tau_f$ do not decrease. Preferably, by controlling x, y, and z so as to fall within a quadrilateral region formed by connecting points A' (x=0.503, y=0.154, z=0.343), B' (x=0.497, y=0.160, z=0.343), C' (x=0.503, y=0.161, z=0.336), and D' (x=0.497, y=0.167, z=0.336) (sides A'B', B'D', D'C', and C'A' being included), excellent $\epsilon_r$ and $\tau_f$ can be maintained, and the average $Q_u$ can be further increased with further decreased variation, to thereby provide a dielectric ceramic composition of dielectric characteristics with small variations.

When the amounts of "K" and "Ta" incorporated in addition to the predominant component are less than the above-described lower limits as reduced to $K_2O$ and $Ta_2O_5$, respectively, particularly when the amount of K is less than the lower limit, based on 100 parts by weight of the aforementioned predominant component, the resultant composition is difficult to sinter, and in some cases, sintered products cannot be yielded. When the amounts of K and Ta are in excess of the upper limits, $Q_u$ greatly decreases, and variation in $Q_u$ increases.

When the ratio by weight of K to Ta is in excess of the upper limit or less than the lower limit, $Q_u$ greatly decreases, and variation in $Q_u$ further increases. By controlling the ratio by weight of K to Ta preferably to 0.25–0.35, more preferably 0.25–0.30, excellent $\epsilon_r$ and $\tau_f$ can be maintained, and the average $Q_u$ can be further increased with further decreased variation, to thereby provide a dielectric ceramic composition of dielectric characteristics with small variations.

K and Ta other than Ta contained in the predominant component form an oxide having a perovskite-mixture-type crystal structure represented by $K_pTaO_q$. In $K_pTaO_q$, K is considered to occupy the Ba site of the predominant component, and Ta is considered to occupy the Zn site or Ta site of the predominant component. The dielectric ceramic composition of the present invention has a perovskite-type crystal structure formed from the predominant component and the perovskite-type structure of $K_pTaO_q$ partially occupying the predominant component, and the entire perovskite-type crystal structure is considered to be a complex perovskite-type crystal structure. In the predominant component, atoms of at least one of Zn and Ta may be substituted to some extent by an element such as Mg, Zr, Ga, Ni, Nb, Sn, or a rare earth metal element; e.g., Y. These elements are readily substituted by Zn or Ta, maintain the perovskite-type crystal structure, and do not impair excellent dielectric characteristics. In the case in which some portion of Ba atoms are substituted by Sr, $\tau_f$ can be modified while the $Q_u$ value is maintained.

The dielectric ceramic composition of the present invention can be produced by mixing together oxides of Ba, Zn, Ta, and K or compounds other than the oxides of Ba, Zn, Ta, and K, which compounds yield corresponding oxides by heating; shaping the resultant mixture; and firing at 1300–1700° C. In addition to the aforementioned oxides of essential metallic elements, there may be incorporated oxides of at least one element such as Mg, Zr, Ga, Ni, Nb, Sn, or a rare earth.metal element; e.g., Y. Through this incorporation, there can be obtained a dielectric ceramic composition in which atoms of at least one of Zn and Ta constituting the predominant component are substituted to some extent by at least one element of the aforementioned elements.

When the firing temperature is less than 1300° C., a sintered product of sufficient density cannot be obtained, resulting in insufficiently increased $Q_u$ in some cases, whereas when the firing temperature is in excess of 1700° C., potassium ions are readily eliminated through volatilization, and the surface of the sintered product becomes porous, resulting in a tendency of failure to attain sufficient improvement in $Q_u$. The firing temperature is preferably 1350–1650° C., particularly preferably 1400–1650° C. In order to attain densification, the firing temperature is preferably controlled to 1500° C. or higher, particularly preferably 1550° C. or higher. No particular limitation is imposed on the firing time, and a firing time of 1 to 8 hours, particularly 2 to 6 hours, can be employed. Firing can be performed in an oxidizing atmosphere such as the natural atmosphere or a reducing atmosphere containing a small amount of hydrogen.

After completion of firing, the fired product may further be heated at a temperature lower than the firing temperature by approximately 50–250° C. in an oxidizing atmosphere for 12 hours or longer, to thereby produce a dielectric ceramic composition of excellent dielectric characteristics with further lower variation. When the temperature of this heat treatment is excessively high, coarse grains are readily formed during grain growth, to thereby fail to provide a sintered product of uniform quality in some cases, whereas when the temperature of the heat treatment is considerably low, the crystal structure does not assume a superlattice structure of a long period, resulting in a tendency of failure to attain sufficient improvement in $Q_u$. The heat treatment temperature is lower than the firing temperature preferably by 70–200° C., particularly preferably by 70–170° C., more preferably by 80–150° C. For example, by controlling the heat treatment temperature to a temperature lower than the firing temperature by about 100° C., a dielectric ceramic composition having a superlattice structure can be produced easily.

The atmosphere of the heat treatment may be an oxidizing atmosphere such as the natural atmosphere. The natural atmosphere is preferred in that no special operation or apparatus are needed. However, by elevating the partial pressure of oxygen in the oxidizing atmosphere to a pressure higher than that in the natural atmosphere, a dielectric ceramic composition having a more excellent $Q_u$ can be obtained. Thus, from the viewpoint of dielectric characteristics, an oxidizing atmosphere of an increased partial pressure of oxygen is preferred. The heat treatment is preferably performed for 12–20 hours. When the heat treatment time is excessively short, formation of a superlattice structure is difficult, resulting in insufficiently improved $Q_u$ in some cases. A heat treatment time of 15 hours or longer, particularly 18 hours or longer, will successfully attain intended effects. Heating for 24 hours suffices for the heat treatment, and no longer heat treatment is necessary.

The dielectric ceramic composition of the present invention is endowed with excellent dielectric characteristics; i.e., there can be attained a $\tau_f$ of −15 to +15 ppm/° C., particularly −10 to +10 ppm/° C., further −5 to +5 ppm/° C. When a test piece having a diameter of 16 mm and a height of 8 mm is formed from the composition, the test piece can be endowed with a product of the measured frequency and $Q_u$ of 25000–30000 GHz, wherein $Q_u$ is measured at a frequency of 4–6 GHz through a parallel plate dielectric cylindrical resonator method ($TE_{011}$ mode). In addition, variation in $Q_u \times f_0$ (measured frequency) is very small, and there can be attained a standard deviation $\sigma_{n-1}$, calculated by the below-mentioned equations, of 700 or lower, particularly 500 or lower, further 300 or lower.

The dielectric resonator of the present invention is characterized by being formed of the dielectric ceramic composition of the present invention, and is endowed with excellent dielectric characteristics. Specifically, a $Q_u$, as measured through a reflection method at a resonance frequency of 1900 MHz, of 40000 or higher can be attained.

In the dielectric ceramic composition of the present invention, no clear reason for enhancement in $Q_u$ through substitution of Ba by K is elucidated. However, it is considered that one possible reason is that $K_pTaO_q$ having a perovskite-type crystal structure forms a solid solution with the predominant component having a complex-perovskite-type crystal structure, to thereby provide a superlattice structure of a long period in the crystal structure of the dielectric ceramic composition. When $K_pTaO_q$ of an unspecified composition is present, vacancies are regularly arrayed, to thereby form a superlattice structure. In addition, it is also considered that the presence of vacancies facilitates transfer of ions, elements, and the like during a firing step, to thereby promote densification. Thus, although conventional dielectric ceramic compositions of this type require long-term firing, firing by ultra-high-speed temperature elevation technique, etc. so as to attain densification, the dielectric ceramic composition of the present invention can be readily densified.

BRIEF DESCRIPTION OF THE DRAWINGS

FIG. 1 shows a ternary composition diagram of three components constituting the predominant component of the dielectric ceramic composition of the present invention.

BEST MODES FOR CARRYING OUT THE INVENTION

Figure 2:
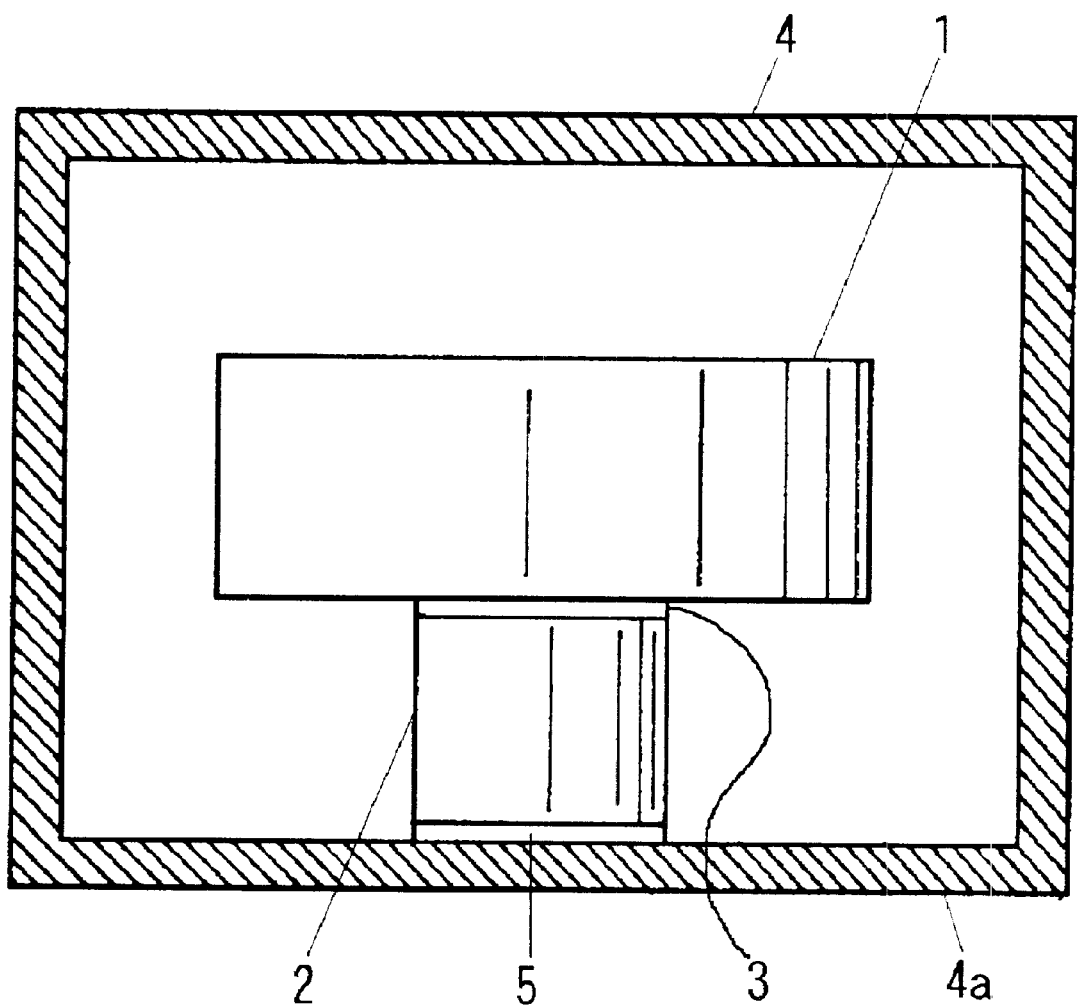
FIG. 2 shows a sketch of a test sample in which $Q_u$ of the dielectric resonator of the present invention formed of the dielectric ceramic composition of the present invention was measured.

The present invention will next be described by way of examples.

TEST EXAMPLES 1 to 26

(1) Production of Dielectric Ceramic Compositions

Commercial $BaCO_3$, ZnO, $Ta_2O_5$, and $K_2CO_3$ powders were weighed such that the compositions for Test Examples 1 to 26 shown in TABLE 1 were attained. Each of the thus-weighed powders was placed into a resin-made pot and dry-milled by use of a resin-ball mill, to thereby prepare a mixture powder. All proportions by amount shown in TABLE 1 are reduced to the corresponding oxides.

Subsequently, each mixture powder was calcined at 1100° C. for two hours. The calcined powder, poly(vinyl alcohol) serving as an organic binder, and water were placed into a resin-made pot, and the resultant mixture was milled by use of a resin-ball mill. The milled powder was dried through a spray dryer method and granulated, and the resultant granular powder was shaped by pressure into a column having a diameter of 19 mm and a height of 11 mm. The column was employed as a shaped body serving as a test piece for measuring dielectric characteristics. In the case of Test Examples 1, 4, 5, 12, and 24, in a similar manner, a shaped body having the shape of a cylindrical resonator and an outer diameter of 38 mm, an inner diameter 21 mm, and a height of 21 mm was formed from each composition of these Test Examples. These shaped bodies were maintained at 1650° C. for eight hours, to thereby prepare sintered bodies for use as test pieces and those having the shape of a resonator.

(2) Evaluation of Dielectric Characteristics

The surface of each sintered body obtained in (1) for serving as a test piece was polished, to thereby prepare a test piece having a diameter of 16 mm and a height of 8 mm. The test piece was subjected to measurement of $\epsilon_r$, $Q_u$, and $\tau_f$ (temperature range: 25–80° C.) through a parallel plate dielectric cylindrical resonator method ($TE_{011}$ mode) at a frequency of 4–6 GHz. The results are shown in TABLE 1. In another measurement, the surface of the sintered body having the shape of a resonator was polished so as provide a resonator having a resonance frequency of 1900 MHz, and $Q_u$ was measured through a reflection method. The results are shown in TABLE 2.

The $Q_u$ of the resonator having a resonance frequency of 1900 MHz was measured by use of a test sample as shown in FIG. 2. In FIG. 2, a resonator 1 is bonded, by use of an epoxy resin adhesive or similar material, to one end of a support 2 formed of a material such as sintered alumina-base material. Reference numeral 3 represents an adhesive layer. The unified body obtained from the resonator 1 and the support 2 was placed inside a cylinder-shape metal container 4 of which two end surfaces were tightly closed, and another end of the support 2 is bonded and fixed by use of a PTTF to a center portion of a bottom surface 4a of the metal container 4. Reference numeral 5 represents a fixation section.

The standard deviation $\sigma_{n-1}$ of $Q_u \times f_0$ in TABLE 1 and that of $Q_u$ in TABLE 2 were calculated on the basis of the following equations (1) and (2):

$$\sigma_{n-1} = V^{1/2} \qquad (1)$$

$$V = s/(n-1) \qquad (2),$$

to thereby evaluate variations.

In the equations, V represents variance and s represents sum of squares of deviations from the mean. The number of the test pieces, n, was 30.

TABLE 1

| Test Ex. | xBaO—yZnO—½zTa$_2$O$_5$ | | | $K_2O$ | $Ta_2O_5$ | $K_2O/Ta_2O_5$ | $\epsilon_r$ | $\tau_f$ (ppm/° C.) | $Q_u$ | |
|---|---|---|---|---|---|---|---|---|---|---|
| | x | y | z | | | | | | $Q_u*f_o$ | $\sigma_{n-1}$ |
| *1 | 0.5000 | 0.1670 | 0.3330 | 0.60 | 2.40 | 0.25 | 29 | +6 | 27900 | 1172 |
| 2 | 0.5000 | 0.1645 | 0.3355 | 0.40 | 1.60 | 0.25 | 29 | +4 | 28800 | 634 |
| 3 | 0.5000 | 0.1620 | 0.3380 | 0.25 | 0.83 | 0.30 | 28 | +3 | 29700 | 327 |
| 4 | 0.5000 | 0.1595 | 0.3405 | 1.40 | 4.67 | 0.30 | 29 | 0 | 29565 | 177 |
| 5 | 0.5000 | 0.1570 | 0.3430 | 0.70 | 3.68 | 0.19 | 28 | +6 | 29025 | 261 |
| 6 | 0.4975 | 0.1670 | 0.3355 | 1.20 | 4.44 | 0.27 | 29 | −2 | 27675 | 332 |
| 7 | 0.4975 | 0.1620 | 0.3405 | 0.30 | 0.86 | 0.35 | 28 | +4 | 28260 | 593 |
| *8 | 0.4950 | 0.1670 | 0.3380 | 0.80 | 2.67 | 0.30 | 28 | +6 | 27900 | 1256 |
| 9 | 0.5025 | 0.1620 | 0.3355 | 0.40 | 1.60 | 0.25 | 29 | +4 | 28350 | 652 |
| 10 | 0.5025 | 0.1595 | 0.3380 | 0.70 | 1.84 | 0.38 | 28 | +7 | 28260 | 509 |
| *11 | 0.4950 | 0.1720 | 0.3330 | 0.60 | 1.71 | 0.35 | 28 | +4 | 23963 | 1054 |
| *12 | 0.5050 | 0.1620 | 0.3330 | 0.50 | 1.67 | 0.30 | 28 | +7 | 26955 | 1159 |
| *13 | 0.5050 | 0.1520 | 0.3430 | 0.90 | 3.60 | 0.25 | 29 | +5 | 26190 | 1414 |
| *14 | 0.5000 | 0.1520 | 0.3480 | 1.60 | 4.57 | 0.35 | 29 | −1 | 23130 | 1064 |
| *15 | 0.4950 | 0.1570 | 0.3480 | 1.40 | 3.68 | 0.38 | 28 | −1 | 25920 | 1426 |
| *16 | 0.5100 | 0.1570 | 0.3330 | 1.40 | 5.60 | 0.25 | 28 | 0 | 24345 | 1242 |
| 17 | 0.5000 | 0.1621 | 0.3379 | 1.60 | 8.00 | 0.20 | 28 | −4 | 28260 | 254 |
| 18 | 0.4990 | 0.1610 | 0.3400 | 1.20 | 4.80 | 0.25 | 29 | 0 | 28755 | 316 |
| 19 | 0.5015 | 0.1600 | 0.3385 | 0.80 | 3.20 | 0.25 | 29 | +4 | 28845 | 606 |
| 20 | 0.4990 | 0.1650 | 0.3360 | 1.00 | 3.33 | 0.30 | 29 | −2 | 28655 | 516 |
| *21 | 0.4980 | 0.1620 | 0.3400 | 0.10 | 0.40 | 0.25 | | | Not sintered | |
| *22 | 0.5000 | 0.1635 | 0.3365 | 2.00 | 7.00 | 0.28 | 29 | −4 | 21060 | 906 |
| *23 | 0.4990 | 0.1625 | 0.3385 | 0.15 | 0.40 | 0.39 | | | Not sintered | |
| *24 | 0.5010 | 0.1590 | 0.3400 | 1.50 | 8.50 | 0.18 | 29 | −8 | 18720 | 1348 |
| *25 | 0.5010 | 0.1590 | 0.3400 | 1.20 | 7.50 | 0.16 | 29 | −6 | 18540 | 1428 |
| *26 | 0.5000 | 0.1635 | 0.3365 | 0.25 | 0.55 | 0.45 | 29 | −10 | 14040 | 1095 |

TABLE 2

| Test Ex. | xBaO—yZnO—½zTa$_2$O$_5$ | | | K$_2$O | Ta$_2$O$_5$ | K$_2$O/Ta$_2$O$_5$ | Resonator (1900 MHz) | |
|---|---|---|---|---|---|---|---|---|
| | x | y | z | | | | Q$_u$ | σ$_{n-1}$ |
| *1 | 0.5000 | 0.1670 | 0.3330 | 0.60 | 2.40 | 0.25 | 38700 | 1625 |
| 4 | 0.5000 | 0.1595 | 0.3405 | 1.40 | 4.67 | 0.30 | 45500 | 410 |
| 5 | 0.5000 | 0.1570 | 0.3430 | 0.70 | 3.68 | 0.19 | 44700 | 447 |
| *12 | 0.5050 | 0.1620 | 0.3330 | 0.50 | 1.67 | 0.30 | 35000 | 1925 |
| *24 | 0.5010 | 0.1590 | 0.3400 | 1.50 | 8.50 | 0.18 | 26000 | 1222 |

As is clear from the results of TABLE 1, the compositions of Test Examples 2 to 7, 9 to 10, and 17 to 20, falling within the scope of the present invention, exhibit excellent properties; i.e., an $\in_r$ of 28–29 with small variation and a $\tau_f$ of −4 to +7 ppm/° C. The results indicate that the $Q_u \times f_0$ is as high as 27675–29700 GHz, and the maximum $\sigma_{n-1}$ thereof is 652, indicating small variation. In contrast, the compositions of Test Example 1 (z falling outside the scope of the present invention) and Test Example 8 (x falling outside the scope of the present invention) exhibit very large variations in $Q_u$. In addition, the compositions of Test Examples 11 to 16 (x and z, and in the case of Test Example 11 x, z, and y, falling outside the scope of the present invention) exhibit tendency of decrease in $Q_u$ and very large variations in $Q_u$. The results also indicate that the compositions of Test Examples of 21 to 26, in which the amount of K as reduced to K$_2$O, the amount of Ta as reduced to Ta$_2$O$_5$, or the ratio by weight of K to Ta falls outside the scope of the invention, cannot be sintered in some cases, and $Q_u$ further decreases and variations in $Q_u$ are large.

As is clear from the results of TABLE 2, the compositions of Test Examples 4 to 5, falling within the scope of the present invention, exhibit $Q_u$ as high as 44700 and 45500, and $\sigma_{n-1}$ thereof of 410 and 447, indicating small variation. In contrast, the composition of Test Example 1 (z falling outside the scope of the present invention) exhibits tendency of decrease in $Q_u$ and large variations in $Q_u$. In addition, the composition of Test Example 12 (x and z falling outside the scope of the present invention) exhibits tendency of decrease in $Q_u$ and very large variations in $Q_u$. The results also indicates that the composition of Test Example 24, in which the ratio by weight of K as reduced to K$_2$O to Ta as reduced to Ta$_2$O$_5$ falls outside the scope of the invention, shows further decrease in $Q_u$.

The present invention is not limited to the aforementioned specific Examples, and numerous modifications and variations in accordance with purposes and uses are possible in light of the spirit of the present invention. For example, in addition to the aforementioned BaCO$_3$ and K$_2$CO$_3$ serving as a raw materials for producing BaO and K$_2$O, compounds such as peroxides, hydroxides, and nitrates of Ba and K can also be used. Similarly, not only oxides of other elements, but also a variety of compounds thereof which transform, upon heating, into the corresponding oxides can also be used.

INDUSTRIAL APPLICABILITY

According to the dielectric ceramic composition of the present invention, a dielectric ceramic composition endowed with a comparatively high $\in_r$, a small absolute value of $\tau_f$, and a high $Q_u \times f_0$, with small variations thereof, can be provided. According to the dielectric resonator of the present invention, a dielectric resonator of excellent performance can be obtained by employing the dielectric ceramic composition of the present invention endowed with excellent dielectric characteristics.

What is claimed is:

1. A dielectric ceramic composition containing Ba, Zn, and Ta comprising:

(a) about 100 parts by weight of an oxide of the formula xBaO—yZnO—(½)zTa$_2$O$_5$, where x, y, and z represent compositional proportions by mol and x+y+z=1, and where x, y, and z fall within a quadrilateral region formed by connecting points A (x=0.503, y=0.152, z=0.345), B (x=0.497, y=0.158, z=0.345), C (x=0.503, y=0.162, z=0.335), and D (x=0.497, y=0.168, z=0.335) and including sides AB, BD, DC, and CA;

(b) about 0.2–1.6 parts by weight K as K$_2$O; and (c) about 0.7–8 parts by weight Ta as Ta$_2$O$_5$, wherein the ratio by weight of K to Ta falls within the range of about 0.185–0.4.

2. A dielectric ceramic composition of claim 1, wherein the ratio by weight of K to Ta falls within the range of about 0.25–0.35.

3. A dielectric ceramic composition of claim 2, wherein the ratio by weight of K to Ta falls within the range of about 0.25–0.30.

4. A dielectric ceramic composition of claim 1, 2 or 3, wherein the product of measured resonance frequency and high unloaded quality factor:

$$f_o \times Q_u$$

is about 25000–30000 GHz, where said $Q_u$ is measured at a frequency of 4–6 GHz through a parallel plate dielectric cylindrical resonator method (TE$_{011}$ mode).

5. A dielectric ceramic composition of claim 1, wherein the temperature coefficient, $\tau_f$, is about −15−+15 ppm/° C.

6. A dielectric ceramic composition containing Ba, Zn and Ta comprising:

(a) about 100 parts by weight of an oxide of the formula xBaO—yZnO—(½)zTa$_2$O$_5$ where x, y, and z represent compositional proportions by mol and x+y+z=1, and where x, y, and z fall within a quadrilateral region formed by connecting points A' (x=0.503, y=0. 154, z=0.343), B' (x=0.497, y=0.160, z=0.343), C' (x=0.503, y=0.161, z=0.336),and D' (x=0.497, Y=0.167, z=0.336) and including sides A'B', B'D', D'C', and C'A';

(b) about 0.2–1.6 parts by weight K as K$_2$O; and (c) about 0.7–8 parts by weight Ta as Ta$_2$O$_5$, wherein the ratio by weight of K to Ta falls within the range of about 0.185–0.4.

7. A dielectric resonator comprising a dielectric ceramic composition which comprises:

(a) about 100 parts by weight of an oxide of the formula xBaO—yZnO—(½)zTa$_2$O$_5$, where x, y, and z represent compositional proportions by mol and x+y+z=1, and where x, y, and z fall within a quadrilateral region formed by connecting points A (x=0.503, y=0.152, z=0.345), B (x=0.497, y=0.158, z=0.345), C (x 0.503, y=0.162, z=0.335), and D(x=0.497, y=0.168, z 0.335) and including sides AB, BD, DC, and CA;

(b) about 0.2–1.6 parts by weight K as $K_2O$; and (c) about 0.7–8 parts by weight Ta as $Ta_2O_5$, wherein the ratio by weight of K to Ta falls with the range of about 0.185–0.4.

8. A dielectric resonator of claim 7, wherein the dielectric resonator exhibits an unloaded quality factor, $Q_u$, as measured through a reflection method at a resonance frequency of 1900 MHz, of about 40000 or higher.

* * * * *